(12) United States Patent
Frank et al.

(10) Patent No.: US 7,450,367 B2
(45) Date of Patent: Nov. 11, 2008

(54) CLEANING APPARATUS

(75) Inventors: Juergen Frank, Kirchberg (DE); Maic Hensel, Winnenden (DE); Holger Lepold, Nellmersbach (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 0 days.

(21) Appl. No.: 11/891,038

(22) Filed: Aug. 7, 2007

(65) Prior Publication Data

US 2008/0062618 A1    Mar. 13, 2008

Related U.S. Application Data

(63) Continuation of application No. PCT/EP2005/012654, filed on Nov. 26, 2005.

(30) Foreign Application Priority Data

Feb. 11, 2005    (DE) .................. 10 2005 007 923

(51) Int. Cl.
*H02B 1/00* (2006.01)
*A47L 9/08* (2006.01)

(52) U.S. Cl. .................. 361/600; 361/601; 15/412

(58) Field of Classification Search .............. None
See application file for complete search history.

(56) References Cited

U.S. PATENT DOCUMENTS

| | | | | |
|---|---|---|---|---|
| 4,032,806 A | * | 6/1977 | Seely | 310/50 |
| 4,573,234 A | * | 3/1986 | Kochte et al. | 15/323 |
| 5,014,388 A | * | 5/1991 | Schiazza et al. | 15/339 |
| 5,764,477 A | * | 6/1998 | Ohgami et al. | 361/683 |
| 6,102,721 A | * | 8/2000 | Seto et al. | 439/160 |
| 6,203,363 B1 | * | 3/2001 | Yanaura | 439/500 |
| 6,311,366 B1 | * | 11/2001 | Sepke et al. | 15/412 |
| 6,397,429 B1 | * | 6/2002 | Legatt et al. | 15/401 |
| 6,448,732 B1 | | 9/2002 | Block | |
| 2003/0044251 A1 | * | 3/2003 | Lagaly et al. | 409/182 |
| 2006/0268504 A1 | * | 11/2006 | Shimizu et al. | 361/683 |

FOREIGN PATENT DOCUMENTS

| | | |
|---|---|---|
| DE | 37 42 268 | 6/1989 |
| DE | 37 43 082 | 6/1989 |
| FR | 2 690 328 | 10/1993 |
| GB | 2311 598 | 10/1997 |
| JP | 2003219999 A * | 8/2003 |

OTHER PUBLICATIONS

*Patent Abstracts of Japan*, vol. 014, No. 485, Oct. 13, 1990, Abstract of Japanese Patent "Battery Type Electric Cleaner", Publication No. 02200230, Aug. 8, 1990.

* cited by examiner

*Primary Examiner*—Boris L Chervinsky
(74) *Attorney, Agent, or Firm*—Lipsitz & McAllister, LLC

(57) ABSTRACT

The invention relates to a cleaning apparatus comprising a cleaning unit driven by an electric motor and a housing which has a battery chamber for accommodating at least one rechargeable battery, a connecting device having a mechanical mounting part and an electrical plug connector part being disposed in the battery chamber for establishing an electrical and mechanical connection between the battery and the cleaning apparatus. In order to further develop said cleaning apparatus in such a way that batteries of different physical shapes can be used, the invention proposes that the mounting part is detachably mounted in the battery chamber, and the plug connector part is detachably connectable as desired to the mounting part or to a chamber wall of the battery chamber.

21 Claims, 6 Drawing Sheets

CLEANING APPARATUS

This application is a continuation of international application number PCT/EP2005/012654 filed on Nov. 26, 2005.

The present disclosure relates to the subject matter disclosed in international application number PCT/EP2005/012654 of Nov. 26, 2005 and German application number 10 2005 007 923.7 of Feb. 11, 2005, which are incorporated herein by reference in their entirety and for all purposes.

BACKGROUND OF THE INVENTION

The invention relates to a cleaning apparatus, in particular a suction apparatus, comprising a cleaning unit driven by an electric motor and comprising a housing which has a battery chamber for accommodating at least one rechargeable battery, a connecting device having a mechanical mounting part and an electrical plug connector part being disposed in the battery chamber for establishing an electrical and mechanical connection between the battery and the cleaning apparatus.

Cleaning apparatuses of this type can be used to clean a surface, for example a floor surface. To this end, the cleaning apparatus comprises a cleaning unit having an electric motor. In order to supply power to the cleaning unit, said cleaning unit can usually be connected to a mains voltage by means of a connection cable. As an alternative, the supply of power can be ensured by a rechargeable battery which can be inserted into the battery chamber. The battery chamber contains a connecting device for establishing a mechanical and electrical connection between the battery and the cleaning apparatus. The battery is fixed in position by means of the mechanical mounting part, and the electrical connection between the battery and the cleaning unit driven by an electric motor can be established by means of the electrical plug connector part.

The rechargeable batteries used are usually matched to the cleaning apparatus to which they are to be fitted both in terms of their electrical properties, in particular the battery voltage, and also with respect to their physical shape. This has the advantage that the shape of the battery chamber can correspond exactly to the physical shape of the battery to be accommodated and the batteries can be securely held in the battery chamber in a simple manner. However, this is associated with the disadvantage that the respectively matched batteries have to be available to the user and other batteries, which the user already uses for electric tools for example, cannot be used.

It is an object of the present invention to further develop a cleaning apparatus of the type mentioned in the introduction in such a way that batteries of different physical shapes can be used.

SUMMARY OF THE INVENTION

According to the invention, this object is achieved in a cleaning apparatus of the generic type by the mounting part being detachably mounted in the battery chamber, and the plug connector part being detachably connectable as desired to the mounting part or to a chamber wall of the battery chamber.

Power can be supplied to the cleaning apparatus according to the invention both by means of rechargeable batteries whose physical shape is matched specifically to said cleaning apparatus and also by means of extraneous batteries whose physical shape is not matched to the shape of the battery chamber. If batteries which are matched to the cleaning apparatus are used, the mounting part can be secured in the battery chamber for this purpose and the plug connector part can be connected to the mounting part. At least one battery which is matched to the cleaning apparatus can then be inserted into the battery chamber, the mounting part ensuring that the battery is mechanically fixed in position within the battery chamber, and the plug connector part ensuring the electrical connection between the battery and the cleaning unit driven by an electric motor. If power is to be supplied by means of an extraneous battery, it is only necessary to remove the mounting part from the battery chamber and to connect the electrical plug connector part to the chamber wall for this purpose. The extraneous battery can then be securely held within the battery chamber by means of an adapter which is matched firstly to the extraneous battery and secondly to the plug connector part, and be electrically connected to the cleaning unit by means of the plug connector part. It is therefore only necessary for the user to remove the mounting part from the battery chamber and fit the plug connector part, which is electrically connected to the cleaning unit driven by an electric motor by means of electrical connecting lines, to the chamber wall instead of to the mounting part. There is therefore no need to disconnect the electrical connection between the plug connector part and the cleaning unit driven by an electric motor, but only to change the position of the plug connector part, which position said plug connector part assumes in order to establish an electrical connection to the battery. In order to establish a connection to a battery which is matched to the cleaning apparatus, the plug connector part can be connected to the mounting part which can be fixed within the battery chamber, and in order to establish a connection to an extraneous battery the plug connector part can be connected to the chamber wall and the mounting part can be removed from the battery chamber.

Removal of the mounting part from the battery chamber increases the space within the battery chamber, with the result that it is also possible to insert into the battery chamber extraneous batteries with a larger physical volume than batteries which are matched to the cleaning apparatus. The user therefore particularly has the possibility of using extraneous batteries, which are already available to him in connection with the supply of power to his electric tools, for example an electric drill or electric screwdriver, in order to also supply power to the cleaning apparatus.

It is advantageous when the chamber wall of the battery chamber has a plug connector receptacle for inserting the plug connector part. In this case, provision may be made for the plug connector part to be latchable to the plug connector receptacle.

In an advantageous embodiment, the insertion of the plug connector part into the plug connector receptacle is made easier by guide elements which interact with one another being disposed on the plug connector receptacle and on the plug connector part.

In an embodiment which can be produced in a cost-effective manner, the guide elements comprise guide ribs and guide grooves which receive said guide ribs.

Provision may be made, for example, for a guide groove to in each case be disposed on the plug connector part on sides which face away from each other, with a guide rib which is provided on the chamber wall entering said guide groove. However, a reverse arrangement may also be used in such a way that the plug connector part has a respective guide rib, which enters a guide groove which is provided on the chamber wall, on sides which face away from each other.

In a preferred embodiment, the mounting part is detachably connectable to the chamber wall, said mounting part covering the plug connector receptacle. Therefore, when the mounting part is inserted into the battery chamber, the plug connector receptacle is covered by the mounting part and protected by said mounting part against mechanical effects.

The mounting part preferably has an accommodation compartment for accommodating the plug connector part. The plug connector part can therefore be inserted into the accommodation compartment of the mounting part if the cleaning apparatus is to be fitted with batteries which are matched to said cleaning apparatus.

Insertion of the plug connector part into the accommodation compartment can be simplified by guide elements which interact with one another being disposed on the accommodation compartment and on the plug connector part.

The guide elements can comprise guide ribs and guide grooves which receive said guide ribs.

Provision may be made, for example, to provide a guide groove in each case on the plug connector part on sides which face away from each other, with a guide rib which is provided on the mounting part entering said guide groove. As an alternative, provision may be made for the plug connector part to have a respective guide rib, which enters a guide groove which is provided on the mounting part, on sides which face away from each other.

In order to fix the position of a battery which is matched to the cleaning apparatus such that it can bear mechanical loads, a particularly preferred embodiment provides for the mounting part to comprise at least one positively locking element for establishing a positively locking connection to the battery. The positively locking element can, for example, be configured as a guide rib or guide groove or dovetail guide.

It is particularly advantageous when the mounting part has two positively locking elements which are spaced apart from one another and between which the plug connector part can be positioned. The positively locking elements interact with corresponding positively locking parts of the battery and, when the mechanical connection is established between the battery and the positively locking elements, an electrical connection is established at the same time by means of the plug connector part which is disposed between the positively locking elements. To this end, the plug connector part can have a plurality of plug contacts onto which the battery can be placed when the positive connection between the battery and the mounting part is established.

The two positively locking elements are preferably fixedly connected to one another by means of an end wall of the mounting part and, together with the end wall, delimit an accommodation compartment for accommodating the plug connector part. The plug connector part can therefore be inserted between the two positively locking elements, the end wall forming a stop for the plug connector part.

In this case, it is advantageous for the end wall to have an opening which receives a projection of the plug connector part. The projection can pass through the opening and enable the plug connector part to be fixed in position on the mounting part.

In an advantageous embodiment, the establishment of the mechanical connection between the battery and the mounting part is made easier by the at least one positively locking element being disposed on an end face of the mounting part, which end face faces the interior of the battery chamber when the mounting part is inserted into the battery chamber. In a configuration of this type, the positively locking element is easily accessible to the user, he can easily bring the battery into contact with the at least one positively locking element. For example, the positively locking element can form a guide rail which extends in the insertion direction of the battery and onto which the battery can be pushed during insertion into the battery chamber.

The battery which is matched to the cleaning apparatus can be held in a particularly stable manner within the battery chamber by the end face of the mounting part forming a contact surface for contact by the battery above the at least one positively locking element. The battery can be supported flat on the contact surface.

In a preferred embodiment, the chamber wall, to which the plug connector part can be detachably fixed and to which the mounting part is detachably connectable in an advantageous configuration, is configured as a pivotable flap which closes an access opening in the battery chamber. The flap can be pivoted to and fro between a closed position, in which it closes the battery chamber, and an open position, in which the battery is accessible for the purpose of replacing at least one battery, and the flap can serve to hold both batteries which are matched to the cleaning apparatus and also extraneous batteries which can optionally be inserted into the battery compartment. In order to insert a battery, it is only necessary to pivot the flap outward into its open position. If a battery which is matched to the cleaning apparatus is used, the battery is preferably secured on the mounting part which is detachably held on the inside of the flap and to which the plug connector part is detachably connectable. If an extraneous battery is used, said battery is secured on an adapter which can be connected to the plug connector part which is detachably connectable to the inside of the flap.

The mounting part or optionally an adapter can preferably be secured to the inner face of the flap for example by means of a snap-action or clamping connection or else by means of a screw connection.

The cleaning apparatus is preferably configured as a suction apparatus comprising a cleaning unit in the form of a suction unit and comprising a dirt-collection container which has a suction inlet and is in flow connection with the suction unit.

It is advantageous, particularly when the cleaning apparatus is configured as a suction apparatus, for the housing to comprise a housing lower part and a housing upper part which can be placed onto said housing lower part, the cleaning unit and the battery chamber being disposed in the housing upper part. An arrangement of this type has the advantage that no electrical connections between the plug connector part and the cleaning unit driven by an electric motor have to be disconnected when the housing lower part and the housing upper part are separated.

With regard to a physical shape of the cleaning apparatus which is as compact as possible, it is advantageous when the battery chamber is disposed laterally next to the cleaning unit. When the cleaning apparatus is configured as a suction unit, it is advantageous when the battery chamber extends as far as a point where it is beneath the upper edge of the dirt-collection container.

The following description of a preferred embodiment of the invention serves to explain the invention in greater detail in conjunction with the drawings.

DETAILED DESCRIPTION OF THE INVENTION

Figure 1:
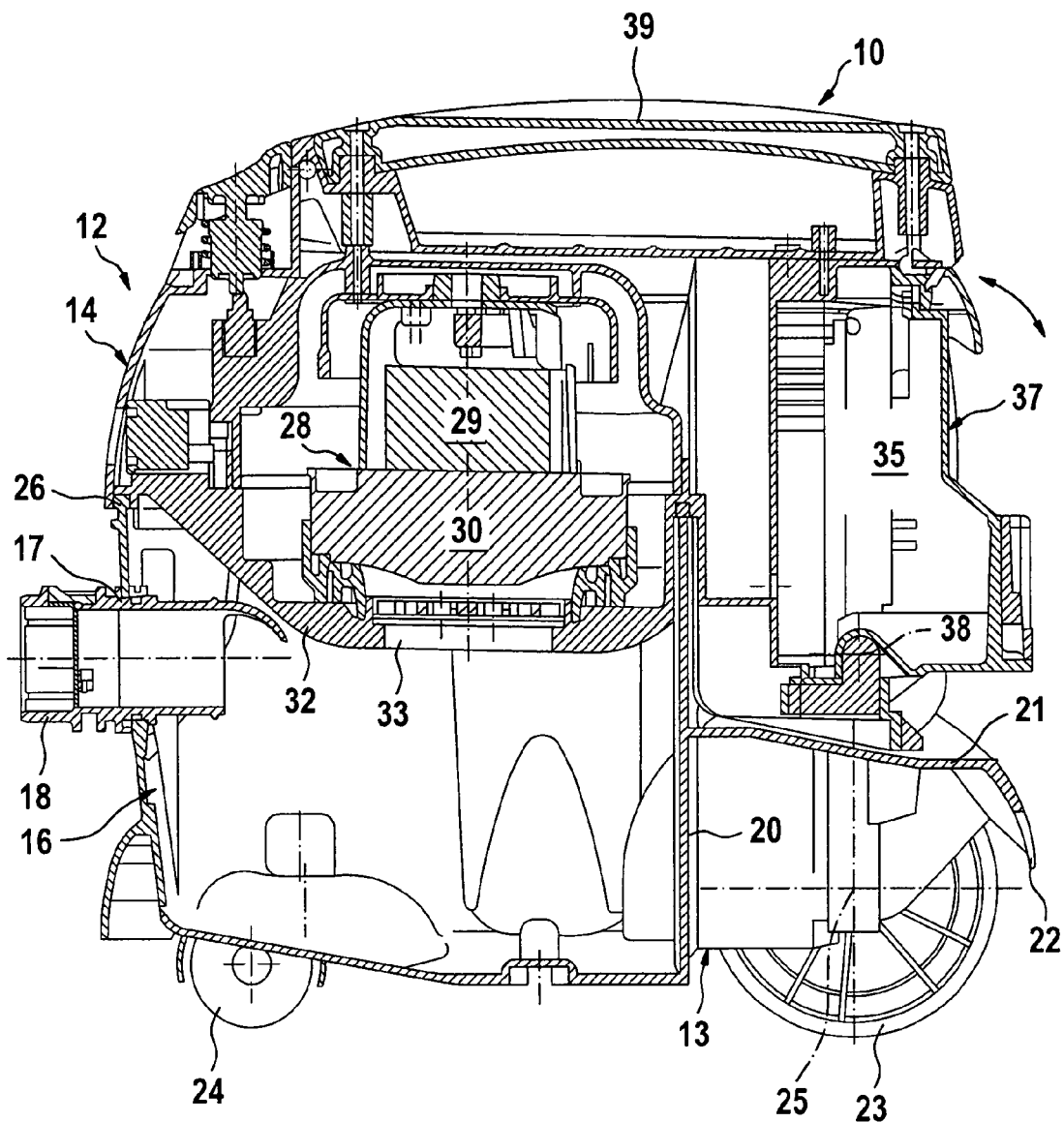
FIG. 1: shows a schematic sectional view of a cleaning apparatus comprising a battery chamber.

In the drawing, a cleaning apparatus according to the invention in the form of a suction apparatus 10 is schematically illustrated. Said apparatus comprises a housing 12 having a housing lower part 13 and a housing upper part 14. The housing lower part 13 forms a dirt-collection container 16 with a suction inlet 17 through which a suction connection piece 18 passes. A suction hose, which is known per se and therefore not illustrated in the drawing and can carry a suction nozzle at its free end, can be connected to the outside of the suction connection piece 18 in a customary manner. A step 21, which is oriented in a substantially horizontal manner and carries a downwardly directed protection wall 22 at its free end, is integrally formed on the rear face 20 of the dirt-collection container 16 approximately halfway up the dirt-collection container, said rear face being directed away from the suction connection piece 18. Two running wheels are mounted on the housing lower part 13 beneath the step 21 such that they can rotate freely about a common axis of rotation 25, only one running wheel 23 being illustrated in the drawing, and a support wheel 24 is rotatably mounted on the housing lower part 13 beneath the suction connection piece 18.

The housing upper part 14 is seated on an upper edge in the form of an upper sealing rim 26 of the dirt-collection container 16 and surrounds a cleaning unit in the form of a suction unit 28 having an electric motor 29 and a suction turbine 30 which is driven by said electric motor. The suction unit 28 is carried by a supporting wall 32 which enters the dirt-collection container 16 and has a suction outlet 33 by means of which the suction unit 28 is in flow connection with the dirt-collection container 16.

Laterally next to the suction unit 28, the housing upper part 14 has a battery chamber 35 which is seated on the step 21 and accommodates two rechargeable batteries for supplying power to the suction unit 28. As an alternative, the suction unit 28 can also be connected to a mains voltage. To this end, the suction apparatus 10 has a connection cable which is known per se and is therefore not illustrated in the drawing.

The battery chamber 35 is accessible via a flap 37 which is disposed on the rear face, which is directed away from the suction connection piece 18, of the housing upper part 14 and forms a chamber wall of the battery chamber 35 and can be pivoted about a pivot axis 38 which is oriented parallel to the rotary shaft 25.

The upper face of the housing upper part 14 has a carrying handle 39 which can be used to raise the housing upper part 14 away from the housing lower part 13, so that the dirt-collection container 16 can be emptied.

The battery chamber 35 can be fitted with two batteries, a single battery being however sufficient to operate the suction apparatus 10, so that the second battery is employed only when the first battery is depleted.

Figure 2:
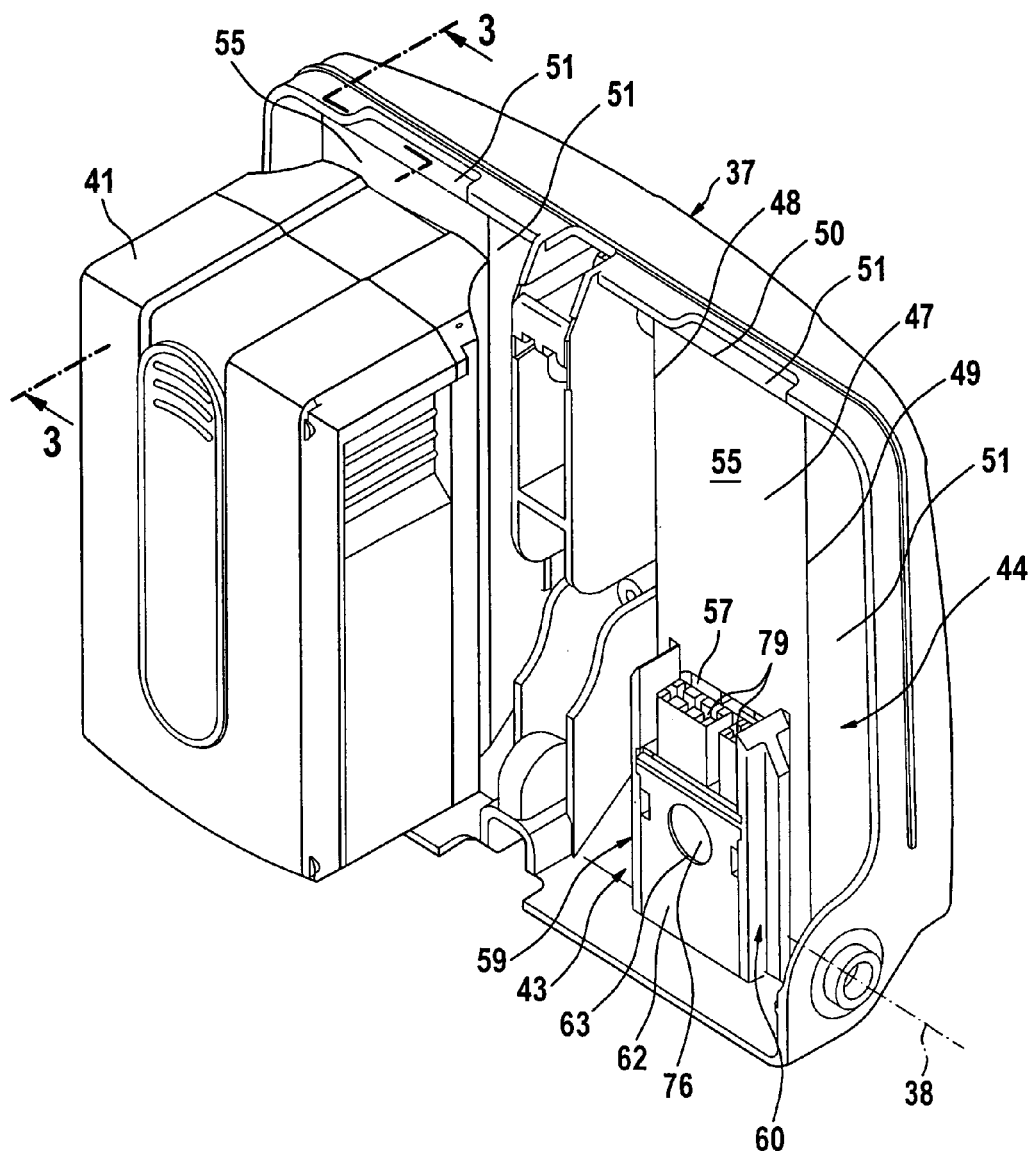
FIG. 2: shows a perspective illustration of a flap which covers the battery chamber with a battery which is held on the inside of the flap and is matched to the cleaning apparatus.
Figure 3:
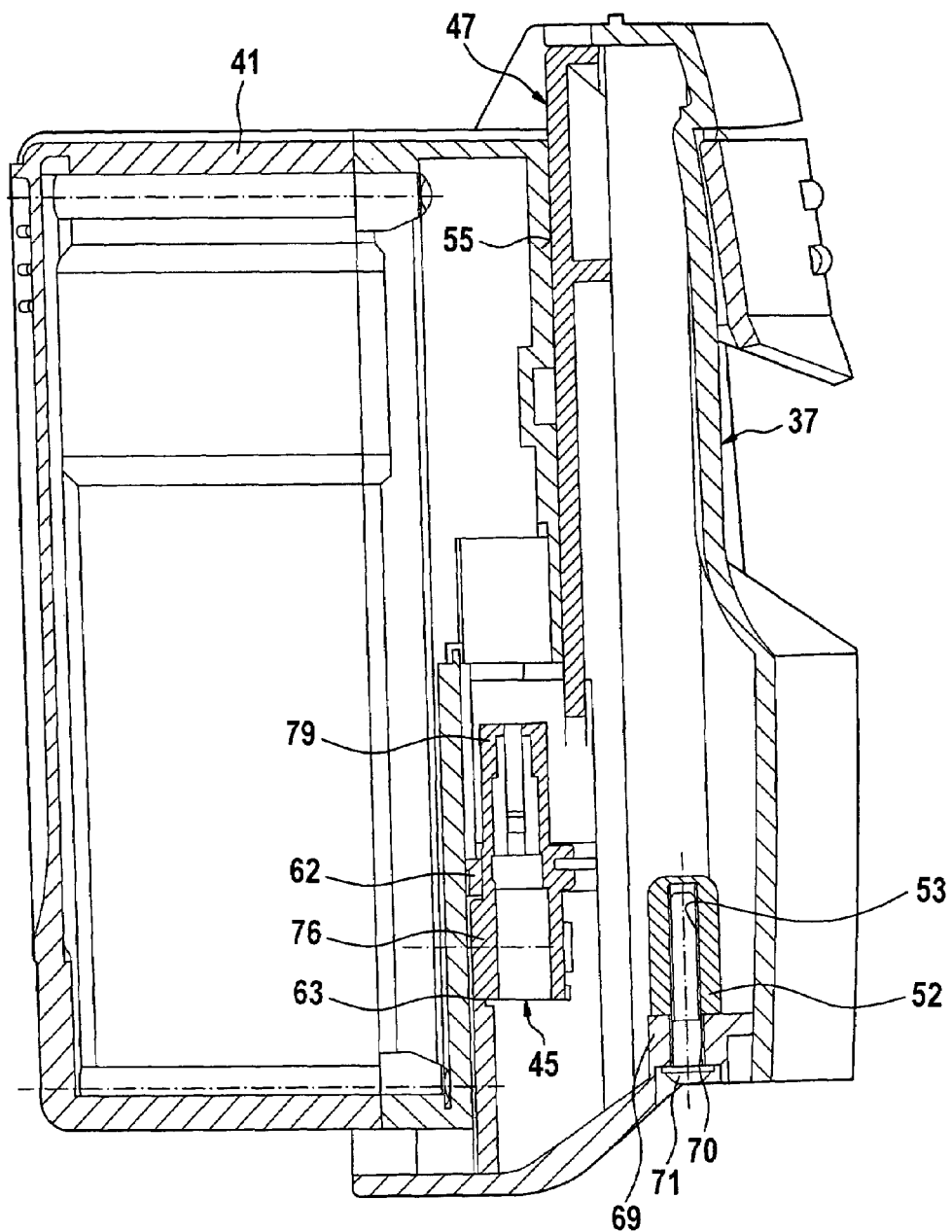
FIG. 3: shows a sectional view along line 3-3 in FIG. 2.
Figure 4:
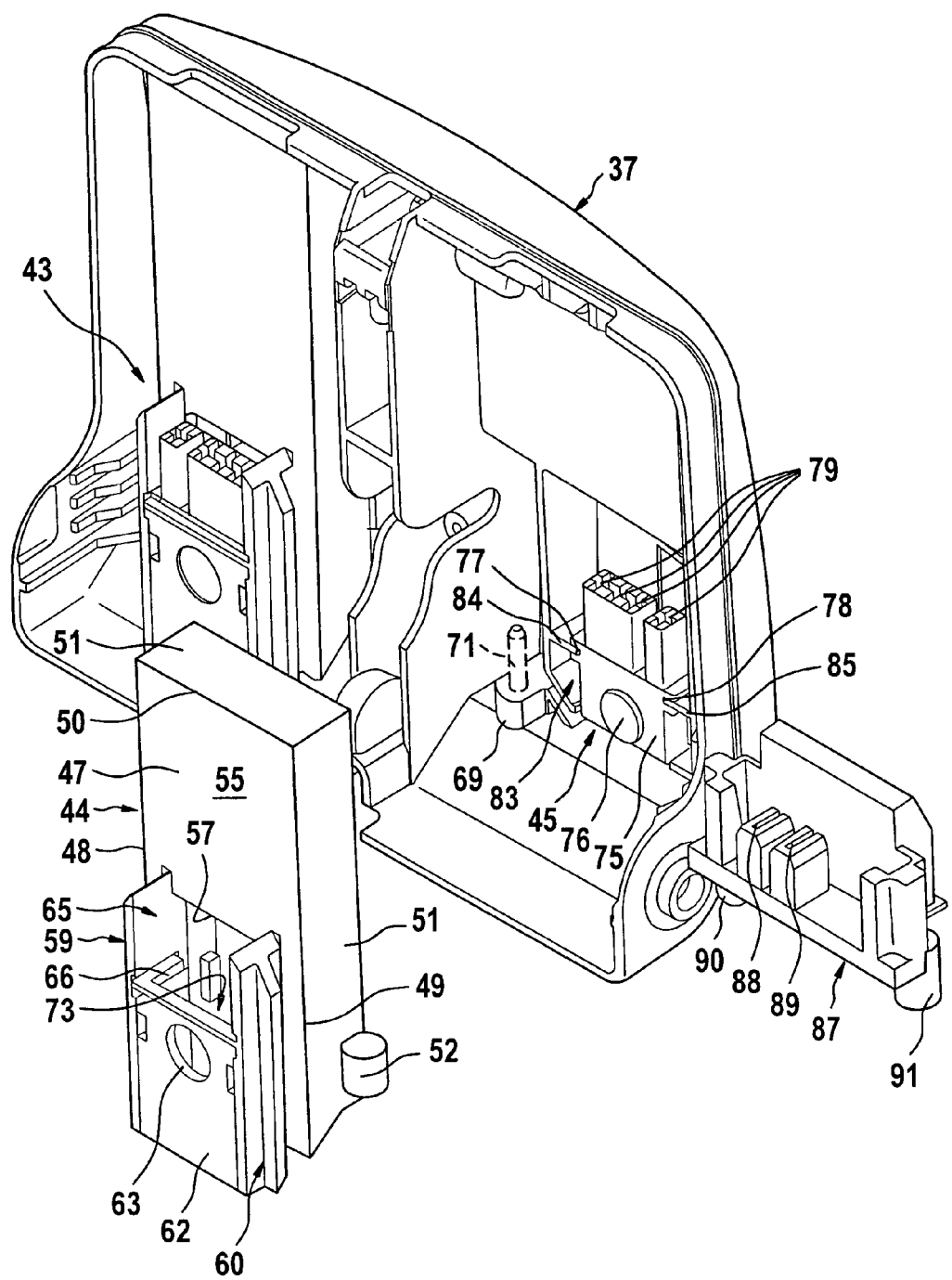
FIG. 4: shows a view of the flap from FIG. 2 in the form of an exploded illustration.

A battery 41 whose physical shape is matched specifically to the suction apparatus 10 is illustrated in FIGS. 2 and 3. The battery 41 is mechanically and electrically connected to the suction apparatus 10 by means of a connecting device 43 which is mounted on the inside of the flap 37 and comprises a mechanical mounting part 44 and an electrical plug connector part 45. As is clear from FIG. 4 in particular, the mounting part 44 has a flat, rectangular end wall 47 from whose longitudinal sides 48, 49 and from whose upper transverse side 50 side walls 51 project to the rear, that is to say in the direction of the flap 37. A screw boss 52 which has an internal thread 53 is integrally formed on each of the side walls 51 on the longitudinal sides. This is clear from FIG. 3.

With its region which borders the upper transverse side 50, the end wall 47 forms a contact surface 55 which is adjoined by a rectangular aperture 57 which is delimited by two positively locking elements in the form of T-shaped guide rails 59, 60 on the longitudinal sides. The guide rails 59, 60 are fixedly connected to one another by means of a connecting wall 62 which is oriented parallel to the contact surface 55. The connecting wall 62 has a circular opening 63 and extends in the longitudinal direction of the guide rails 59, 60 only along a subregion of the guide rails 59, 60, so that a free space 65 is defined between the two guide rails 59, 60 above the connecting wall 62.

The two guide rails 59, 60 each carry a guide rib 66 and, respectively, 67 such that said guide ribs are level with the upper rim of the connecting wall 62 and face one another.

The inside of the flap 37 has connection pieces 69 onto which the mounting part 44 can be placed by means of the screw bosses 52. The connection pieces 69 are provided with a through-hole 70 through which a connecting screw 71 can pass. Therefore, the mounting part 44 can be screwed to the flap 37 by means of the connecting screws 71.

In combination with the connecting wall 62, the guide rails 59, 60 define an accommodation compartment 73 into which the plug connector part 45 can be inserted from the rear. Said plug connector part has a supporting block 75 which carries a circular-cylindrical projection 76 on its front face and, in each case, a guide groove 77 and 78 on outer faces which are directed away from one another. The supporting block 75 carries a plurality of electrical plug contacts 79 on its upper face. If the plug connector part 45 is inserted into the accommodation compartment 73 of the mounting part 44, the guide ribs 66, 67 of the mounting part 44 enter the guide grooves 77 and, respectively, 78 of the supporting block 75, and the projection 76 passes through the opening 63 in the connecting wall 62. The plug contacts 79 then assume a position within the free space 65, as can be seen from FIG. 2 for example, and the mounting part 44 can then be screwed to the flap 37.

Figure 5:
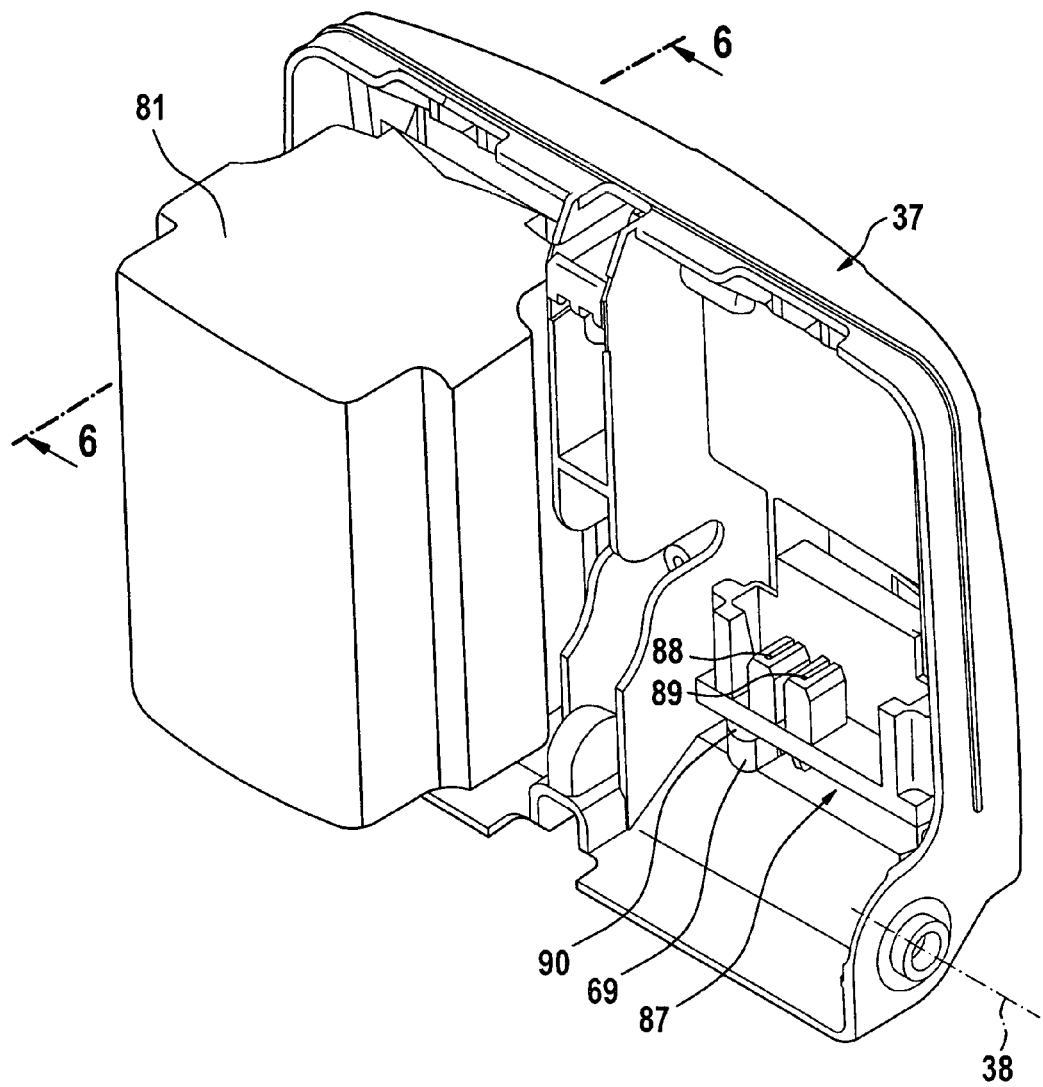
FIG. 5: shows a perspective illustration of the flap from FIG. 2 comprising an extraneous battery which is held on the inside of the flap.
Figure 6:
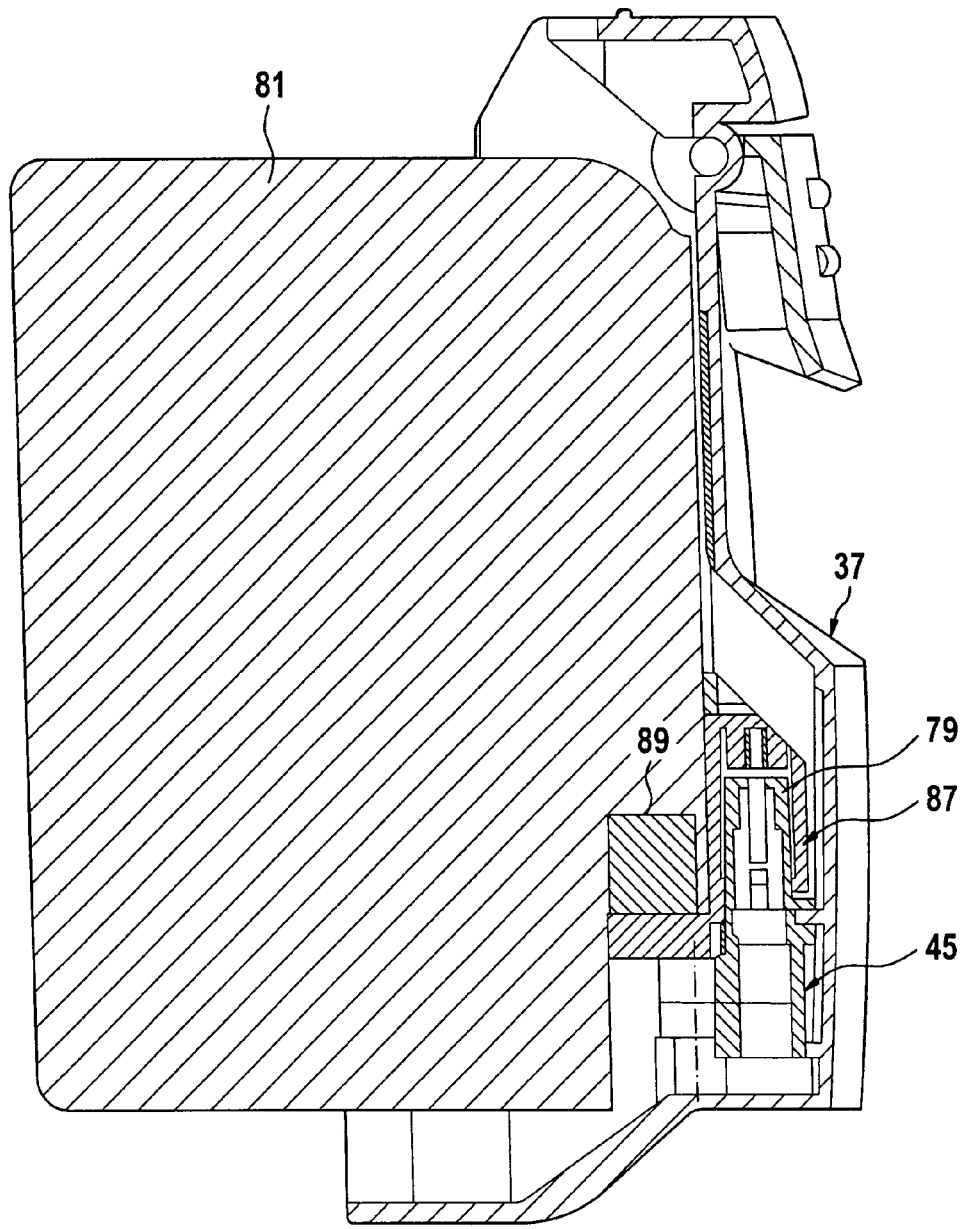
FIG. 6: shows a sectional view along line 6-6 in FIG. 5.

The mounting part 44, with the plug connector part 45 inserted in the accommodation compartment 73 and therefore detachably connected to the mounting part 44, is used when the battery chamber 35 is fitted with a battery 41 which is matched specifically to the suction apparatus 10. However, if the battery chamber 35 is to be fitted with an extraneous battery 81, as is illustrated in FIGS. 5 and 6, the mounting part 44 is removed from the flap 37 by the connecting screws 71 being loosened, and the plug connector part 45 is removed from the accommodation compartment 73 of the mounting part 44. In order to establish a detachable connection to the flap 37, the plug connector part 45 is then introduced into a receptacle 83 which is disposed on the inside of the flap 37 and on which two guide ribs 84, 85 are provided at a distance from one another and receive between them the supporting block 75 of the plug connector part 45 by in each case entering a guide groove 77 or, respectively, 78 of the supporting block 75. The mounting part 44 can be removed from the battery chamber 35, and an adapter 87, which is matched firstly to the extraneous battery 81 being used and secondly to the plug connector part 45, can be placed onto the plug connector part 45 which is introduced into the receptacle 83. The adapter 87 has electrical contact elements 88, 89 to which the extraneous battery 81 can be connected and which are connected to connection contacts of the adapter 87, which connection contacts can be electrically connected to the plug contacts 79 of the plug connector part 45, by means of connecting lines which run within the adapter 87 and are not illustrated in the drawing.

Securing the plug connector part 45 optionally either on the mounting part 44 or on the inside of the flap 37 therefore makes it possible, in a structurally simple manner, to alternatively insert into the battery chamber 35 either batteries 41 which are matched specifically to the suction apparatus 10 or extraneous batteries 81, only one additional adapter 87 being required when an extraneous battery 81 is used, it being possible to screw said adapter to the flap 37 in a similar manner to that used for the mounting part 44 using the connecting screws 71. To this end, the adapter 87 has two screw bosses 90, 91 which can be placed onto the connection pieces 69 of the flap 37.

The invention claimed is:

1. Cleaning apparatus comprising a cleaning unit driven by an electric motor and a housing which has a battery chamber for accommodating at least one rechargeable battery, a connecting device having a mechanical mounting part and an electrical plug connector part being disposed in the battery chamber for establishing an electrical and mechanical connection between the battery and the cleaning apparatus, wherein the mounting part is detachably mounted in the battery chamber, and the plug connector part is detachably connectable as desired to the mounting part or to a chamber wall of the battery chamber.

2. Cleaning apparatus according to claim 1, wherein the chamber wall has a plug connector receptacle for inserting the plug connector part.

3. Cleaning apparatus according to claim 2, wherein guide elements which interact with one another are disposed on the plug connector receptacle and on the plug connector part.

4. Cleaning apparatus according to claim 3, wherein the guide elements comprise guide ribs and guide grooves which receive said guide ribs.

5. Cleaning apparatus according to claim 1, wherein a guide groove is in each case disposed on the plug connector part on sides which face away from each other, with a guide rib which is provided on the chamber wall entering said guide groove.

6. Cleaning apparatus according to claim 2, wherein the mounting part is detachably connectable to the chamber wall, said mounting part covering the plug connector receptacle.

7. Cleaning apparatus according to claim 1, wherein the mounting part has an accommodation compartment for accommodating the plug connector part.

8. Cleaning apparatus according to claim 7, wherein guide elements which interact with one another are disposed on the accommodation compartment and on the plug connector part.

9. Cleaning apparatus according to claim 8, wherein the guide elements comprise guide ribs and guide grooves which receive said guide ribs.

10. Cleaning apparatus according to claim 1, wherein a guide groove is in each case provided on the plug connector part on sides which face away from each other, and a guide rib which is provided on the mounting part enters said guide groove.

11. Cleaning apparatus according to claim 1, wherein the mounting part comprises at least one positively locking element for establishing a positively locking connection to a battery.

12. Cleaning apparatus according to claim 11, wherein the at least one positively locking element is configured as a guide rail.

13. Cleaning apparatus according to claim 11, wherein the mounting part has two positively locking elements which are spaced apart from one another and between which the plug connector part is positionable.

14. Cleaning apparatus according to claim 13, wherein the two positively locking elements are fixedly connected to one another by means of a connecting wall of the mounting part and, together with the connecting wall, delimit an accommodation compartment for accommodating the plug connector part.

15. Cleaning apparatus according to claim 14, wherein the connecting wall has an opening which receives a projection of the plug connector part.

16. Cleaning apparatus according to claim 11, wherein the at least one positively locking element is disposed on an end face of the mounting part, which end face faces the interior of the battery chamber when the mounting part is inserted into the battery chamber.

17. Cleaning apparatus according to claim 16, wherein the end face of the mounting part forms a contact surface for contact by a battery above the at least one positively locking element.

18. Cleaning apparatus according to claim 1, wherein the chamber wall is configured as a pivotable flap which closes an access opening in the battery chamber.

19. Cleaning apparatus according to claim 1, wherein the battery chamber can be fitted with at least two rechargeable batteries, it being possible to alternately operate the cleaning apparatus with one of the batteries which are inserted into the battery chamber.

20. Cleaning apparatus according to claim 1, wherein the cleaning apparatus is configured as a suction apparatus comprising a cleaning unit in the form of a suction unit and comprising a dirt-collection container which has a suction inlet and is in flow connection with the suction unit.

21. Cleaning apparatus according to claim 1, wherein the housing comprises a housing lower part and a housing upper part which can be placed onto said housing lower part, the cleaning unit and the battery chamber being disposed in the housing upper part.

\* \* \* \* \*